(12) United States Patent
Degenhardt et al.

(10) Patent No.: US 9,332,783 B2
(45) Date of Patent: May 10, 2016

(54) METAL-COMPLEXING AROMA COMPOUNDS FOR USE IN AROMA STABILIZATION

(71) Applicant: Symrise AG, Holzminden (DE)

(72) Inventors: Andreas Degenhardt, Holzminden (DE); Gerhard Krammer, Holzminden (DE); Michael Backes, Holzminden (DE)

(73) Assignee: SYMRISE AG, Holzminden (DE)

(*) Notice: Subject to any disclaimer, the term of this patent is extended or adjusted under 35 U.S.C. 154(b) by 402 days.

(21) Appl. No.: 13/862,449

(22) Filed: Apr. 14, 2013

(65) Prior Publication Data

US 2013/0280401 A1     Oct. 24, 2013

Related U.S. Application Data

(60) Provisional application No. 61/637,495, filed on Apr. 24, 2012.

(30) Foreign Application Priority Data

Apr. 24, 2012   (EP) ..................................... 12165287

(51) Int. Cl.
| | | |
|---|---|---|
| A23L 1/24 | (2006.01) | |
| A23L 2/44 | (2006.01) | |
| A23L 3/3499 | (2006.01) | |
| A23L 3/3508 | (2006.01) | |
| A23L 3/3526 | (2006.01) | |
| C11B 5/00 | (2006.01) | |

(52) U.S. Cl.
CPC .................. *A23L 3/3526* (2013.01); *A23L 1/24* (2013.01); *A23L 2/44* (2013.01); *A23L 3/3499* (2013.01); *A23L 3/3508* (2013.01); *C11B 5/005* (2013.01); *C11B 5/0021* (2013.01); *C11B 5/0035* (2013.01); *C11B 5/0085* (2013.01); *C11B 5/0092* (2013.01)

(58) Field of Classification Search
CPC ........... A23L 1/24; A23L 2/44; A23L 3/3499; A23L 3/3508; A23L 3/3526; C11B 5/0021; C11B 5/0035; C11B 5/005; C11B 5/0085; C11B 5/0092
See application file for complete search history.

(56) References Cited

U.S. PATENT DOCUMENTS 5,258,179 A   11/1993   Bracco

FOREIGN PATENT DOCUMENTS

| CA | 2457993 | 8/2004 |
| EP | 2149308 | 2/2010 |
| GB | 557752 | 12/1943 |
| JP | 55054883 | 4/1980 |
| WO | 2010010546 A2 | 1/2010 |

OTHER PUBLICATIONS

Database WPI Week 198023, Thompson Scientific, London, GB; AN 1980-40404C, XP002684466, Apr. 22, 1980.
Database WPI Week 200682, Thompson Scientific, London, GB; AN 2006-800133, XP002684467, Jul. 5, 2006.
European Office Action issued in European Application No. 12 165 287.9 on Aug. 27, 2014.
English Translation of CN-1795767A.
Kris Gunnars: "7 Proven Health Benefits of Dark Chocolate (No. 5 is Best)", Authority Nutrition, Gefunden im Internet: URL: http://authoritynutrition.com/7-health-benefits-dark-chocolate/[gefunden am Aug. 27, 2015].
European Second Office Action issued in European Application No. 12 165 287.9 on Sep. 8, 2015.

*Primary Examiner* — Paul A Zucker
*Assistant Examiner* — Mark Luderer
(74) *Attorney, Agent, or Firm* — Polsinelli PC

(57) ABSTRACT

The present invention relates to the use of one or more compounds of the formulae

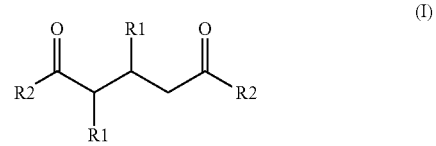
(I)

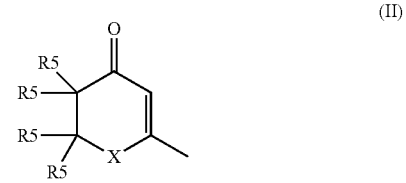

(II)

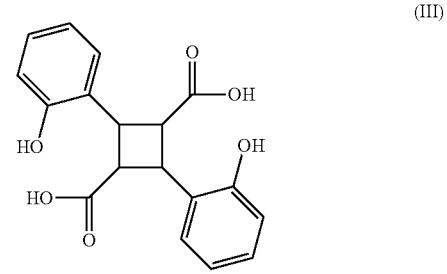

(III)

and/or pharmaceutically acceptable salts thereof for inhibiting the oxidation of fatty acids and/or triacylglycerols; and/or the rancidification of products that includes one or more of fatty acids and/or one or a plurality of triacylglycerols; and/or chemical and/or sensory changes of products that includes one or more of fatty acids and/or one or a plurality of triacylglycerols, caused by the action of the oxygen of the air. Corresponding mixtures and orally consumable preparations and methods are also described.

42 Claims, 2 Drawing Sheets

METAL-COMPLEXING AROMA COMPOUNDS FOR USE IN AROMA STABILIZATION

CROSS-REFERENCE TO RELATED APPLICATIONS

This application claims the benefit of U.S. Provisional Application Ser. No. 61/637,495, filed on 24 Apr. 2012, the benefit of the earlier filing date of which is hereby claimed under 35 USC §119(e). This application claims the benefit of EP Patent Application Serial No. 12 165 287.9, filed on 24 Apr. 2012, the benefit of the earlier filing date of which is hereby claimed under 35 USC §119(a)-(d) and (f). Each application is hereby incorporated in its entirety as if fully set forth herein.

BACKGROUND OF THE INVENTION

1. Field of the Invention

This invention relates generally to the use of metal ion-complexing compounds for flavor stabilization.

2. Description of Related Art

Fats and oils (of vegetable or animal origin) that find application in the food industry are perishable. They are subject to chemical changes, wherein the process of oxidation by the action of the oxygen of the air (autoxidation) is problematic, and in particular is accelerated by elevated temperature and by light. As oxidation products, there is enrichment primarily of decomposition products of oils/fats, which are composed substantially of short-chain carboxylic acids, aldehydes, alcohols and peroxides. Foodstuffs spoiled in this way are generally recognized by a quite unpleasant odor and/or taste, generally identified as rancid. Cool, dry storage of fat-containing products, as far as possible without access of air, increases their quality and stability.

Oils and fats are esters of the trihydric alcohol glycerol with linear aliphatic monocarboxylic acids (the fatty acids). These esters are called triacylglycerols. The fatty acids have considerable variability with respect to chain length and the number of multiple bonds. In particular, unsaturated fatty acids or TAG are affected by undesirable oxidation processes.

In the food industry, stability of flavor and taste is a problem with notable economic consequences. Often traces of metals and metal ions are involved in oxidative degradation reactions, which lead to the development of off flavors and thus contribute to the instability of the product. An attempt is often made to bind and/or inactivate any free metal ions that are present by adding complexing substances. In this connection, a number of complexing substances are known (e.g. ethylenediaminetetraacetic acid—EDTA), although their use is often subject to legal restrictions relating to foods.

The presence of metal ions has a promoting action on the oxidation process, as they support radical-based reactions. Undesirable oxidation is promoted in particular by iron ions.

TAG and fatty acids with multiply unsaturated fatty acids are particularly susceptible to oxidation, so that in particular these oils and fats or products comprising said oils and fats must be stored cool and should hardly be heated.

In particular, small molecules and oligopeptides, which specifically complex iron ions, are known to be natural iron carriers, so-called siderophores. These substances are formed primarily by microorganisms, but also by plants (phytosiderophores). The use of such compounds in food manufacture is already known; its aim is to suppress undesirable oxidation of fats by complexing unwanted metal ions, in particular iron ions.

Thus, in CA 2 457 993, methods are described in which the oxidation of lipids in foodstuffs is delayed by using siderophores and organic acids.

The use of natural antioxidants in foodstuffs is described in EP 2 149 308, wherein nicotianamine, a phytosiderophore, is used as a natural substitute for EDTA.

Antioxidants or extracts of bamboo leaves (so-called AOB), and their antioxidative and metal ion-complexing properties, are described In WO 2005/032275. Use as a food additive is said to block the autoxidation of lipids and bring about the chelation of transition metal ions.

The use of chelating compounds, for example citric acid, tartaric acid, gluconic acid and polyphosphates, for complexing iron ions in particular, is disclosed in GB 886,519.

A protective, antioxidative action of benzoic acid or benzoic acid derivatives is also known. For example, the antioxidative action of p-hydroxybenzoic acid and a plurality of methoxy- or hydroxy-substituted derivatives has been investigated (Natella F, Nardini M, Di Felice M, Scaccini C (1999) Benzoic and Cinnamic Acid Derivatives as Antioxidants: Structure-Activity Relation. J. Agric. Food Chem. 47, 1453-1459).

BRIEF SUMMARY OF THE INVENTION

Briefly described, in a preferred form, the present invention relates to the use of one, two, three or a plurality of compounds of the formulae:

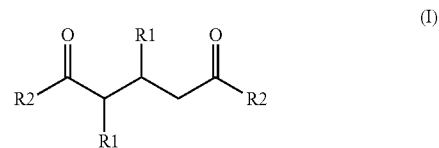

(I)

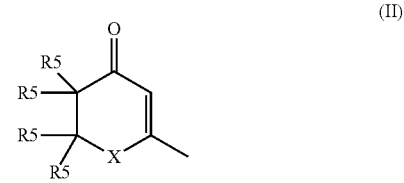

(II)

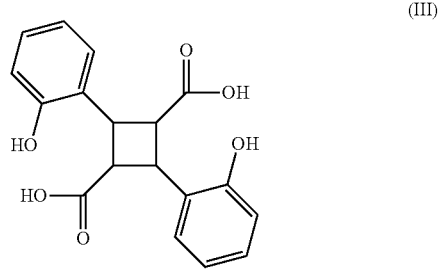 [SMILES: O=C(O)C1C(c2ccccc2O)C(C(=O)O)C1c1ccccc1O]

(III)

and/or pharmaceutically acceptable salts thereof for inhibiting:
- the oxidation of fatty acids and/or triacylglycerols; and/or
- the rancidification of products that comprise one or a plurality of fatty acids and/or one or a plurality of triacylglycerols; and/or
- chemical and/or sensory changes of products that comprise one or a plurality of fatty acids and/or one or a plurality of triacylglycerols, caused by the action of the oxygen of the air.

The compounds or the salts thereof presumably bring about complexation of metal ions in fat- and/or oil-containing foodstuffs and thus stabilize their flavor. Compounds (I), (II) and (III) act as antioxidants. The meanings of the residues R1, R2 and R5 are described below.

Another aspect of the present invention relates to mixtures comprising one or a plurality of compounds of formulae (I), (II) and (III) and/or one or a plurality of salts of compounds of formulae (I), (II) and (III) and fatty acid(s) and/or triacylglycerol(s). Compounds (I), (II) and (III) act as antioxidants in said mixtures and inhibit the oxidation of fatty acids or of triacylglycerols (TAG, also called triglycerides or triacylglycerides or triacylglycerins).

The present invention further relates to certain orally consumable preparations, which comprise a mixture according to the invention and a substrate or a carrier.

The present invention further relates to a corresponding method of treating fatty acids and/or TAG or of products comprising fatty acids and/or TAG, so that the oxidation of the fatty acids and/or of the triacylglycerols or the rancidification of the product that comprises one or a plurality of fatty acids and/or one or a plurality of triacylglycerols and/or the chemical and/or sensory change of the product that comprises one or a plurality of fatty acids and/or one or a plurality of triacylglycerols, caused by the action of the oxygen of the air, is inhibited.

These and other objects, features, and advantages of the present invention will become more apparent upon reading the following specification in conjunction with the accompanying drawing figures.

Further aspects of the present invention and preferred configurations thereof can be seen from the following description, the exemplary embodiments and the claims.

DETAILED DESCRIPTION OF THE PREFERRED EMBODIMENTS

Figure 1:
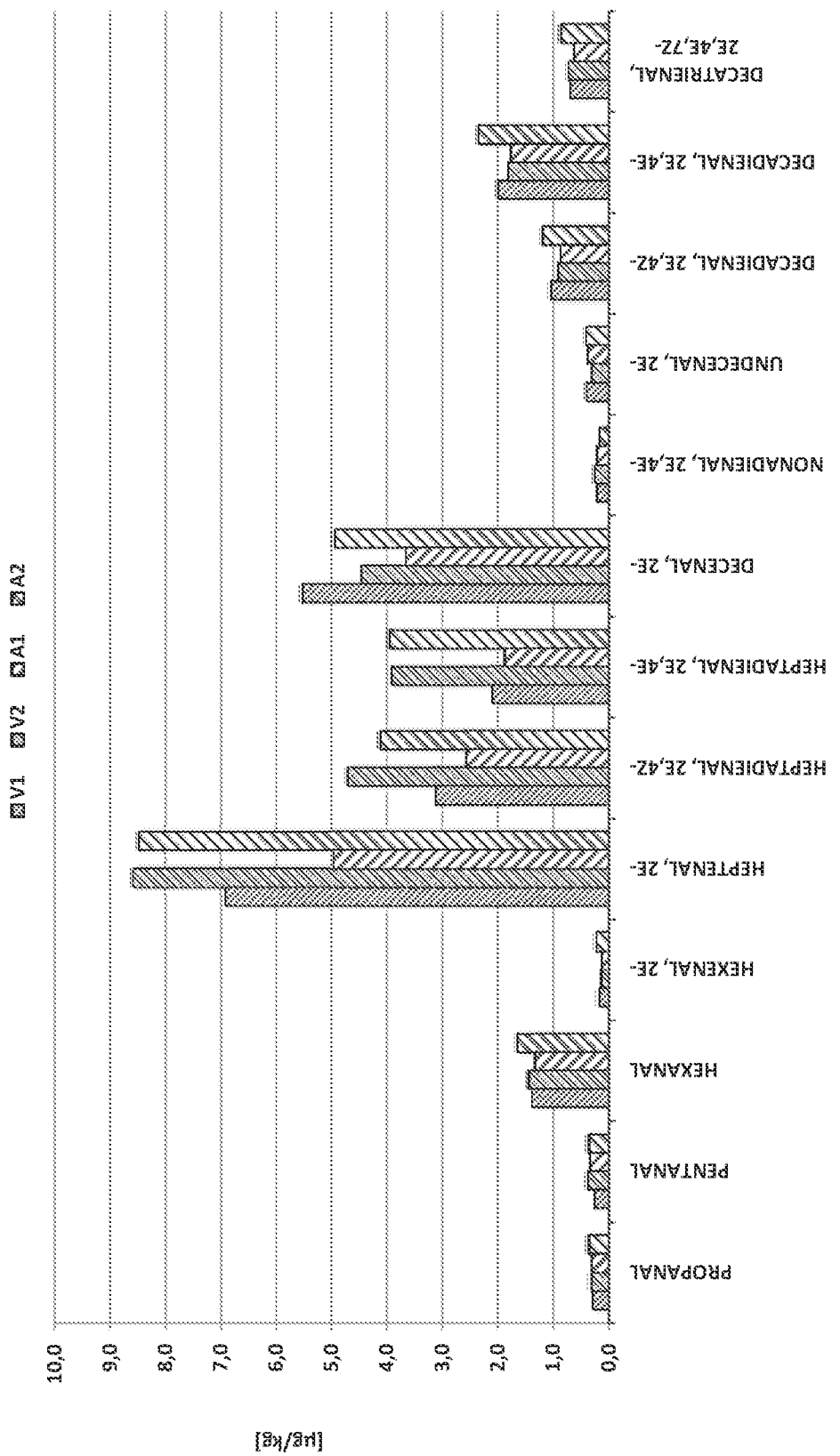
FIG. 1 is a graph of the amount of aldehydes formed in µg/kg (relative to the total weight of a preparation analyzed).

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

A primary objective of the present invention is to provide novel methods or agents for inhibiting one or more of the oxidation of fatty acids and/or triacylglycerols, the rancidification of products that comprise one or a plurality of fatty acids and/or one or a plurality of triacylglycerols, and chemical and/or sensory changes of products that comprise one or a plurality of fatty acids and/or one or a plurality of triacylglycerols, caused by the action of the oxygen of the air.

A special additional objective of the present invention is to provide a substance or a flavoring agent with functional properties, which significantly delays or completely suppresses the oxidation of fat (autoxidation) and therefore the development of rancid aroma notes.

Further and particularly preferred objectives and advantages of the present invention can be seen from the following description, the examples and the appended patent claims.

The present invention is based on the surprising finding that certain aroma-active compounds, namely compounds of formulae (I), (II) and (III), and pharmaceutically acceptable salts thereof are very suitable for inhibiting:

the oxidation of fatty acids and/or triacylglycerols;
the rancidification of products that comprise one or a plurality of fatty acids and/or one or a plurality of triacylglycerols; and
chemical and/or sensory changes of products that comprise one or a plurality of fatty acids and/or one or a plurality of triacylglycerols, caused by the action of the oxygen of the air.

The aforementioned primary objective of the present invention is accordingly achieved according to the invention by using one, two, three or a plurality of compounds selected from the group consisting of i) compounds of formula (I)

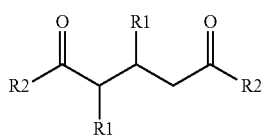

wherein each residue R1 independently of the meaning of the respective other residue R1 denotes H, OH or NH$_2$, and wherein each residue R2 independently of the meaning of the respective other residue R2 denotes OH, OCH$_3$ (methoxy), OC$_2$H$_5$ (ethoxy), OCH$_2$CH$_2$CH$_3$ (n-propoxy), NHCH$_3$ (methylamino), NHC$_2$H$_5$ (ethylamino), NHCH$_2$CH$_2$CH$_3$ (n-propylamino), and pharmaceutically acceptable salts thereof, ii) compounds of formula (II)

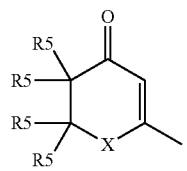

wherein each residue R5 independently of the meaning of the respective other residues R5 denotes H or CH$_3$, and wherein X denotes CH$_2$ or CO, and iii) the compound of formula (III)

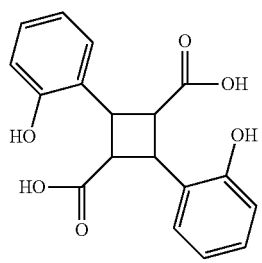

and pharmaceutically acceptable salts thereof;
for inhibiting:
the oxidation of fatty acids and/or triacylglycerols; and/or
the rancidification of products that comprise one or a plurality of fatty acids and/or one or a plurality of triacylglycerols; and/or
chemical and/or sensory changes of products that comprise one or a plurality of fatty acids and/or one or a plurality of triacylglycerols, caused by the action of the oxygen of the air.

The compounds according to the invention of formulae (I) and (III) are, in their pharmaceutically acceptable salts, in the form of mono- or polyvalent anions, wherein unipositively charged cations of the first main group, ammonium ions and/or divalent cations of the second main group are present as counter-ions, wherein the atomic number of the counter-ions from the first and second main group is not above 20 (i.e. is 20 or less). Preferred pharmaceutically acceptable salts are those salts that contain Na$^+$, K$^+$, NH$_4^+$, CA$2^+$ and/or Mg$_2^+$ as counter-ions.

The use according to the invention of one, two, three or a plurality of compounds is preferred, selected from the group consisting of:

i) preferred compounds of formula (I)

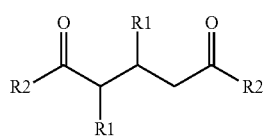

as defined above, wherein each residue R1 independently of the meaning of the respective other residue R1 preferably denotes H or NH$_2$, and/or each residue R2 independently of the meaning of the respective other residue R2 preferably denotes OH or NHC$_2$H$_5$ (ethylamino), and wherein particularly preferably the compound of formula (I) is the compound (Ia) (theanine)

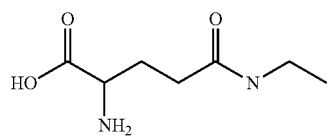

preferably L-theanine,
and pharmaceutically acceptable salts thereof,
ii) compounds of formula (II)

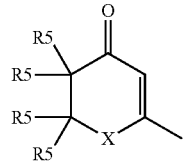

as defined above, selected from the group consisting of:
compound (IIa) (3,5,5-trimethyl-2-cyclohexen-1-one (isophorone)) and compound (IIb) (2,6,6-trimethyl-2-cyclohexene-1,4-dione (ketoisophorone))

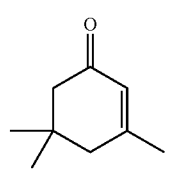

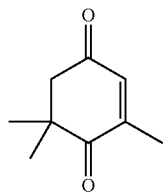
(IIb)

iii) the compound of formula (III) as defined above and pharmaceutically acceptable salts thereof.

The preferred use according to the invention of compounds of formulae (I), (II) and (III) and salts thereof is particularly good for preventing the rancidification of fatty acids and/or TAG or of products that comprise fatty acids and/or TAG. This particularly good prevention of rancidification was not known hitherto for these compounds and salts thereof.

The compounds of formulae (I), (II) and (III) have a particularly good inhibitory activity. Good inhibitory activity means that even small concentrations of use of these compounds produce the desired inhibition when used according to the invention (as described above, preferably as characterized above as preferable) (for the exact concentration data, see below).

Moreover, it was shown, surprisingly, that the compounds of formulae (I), (II) and (III), along with the capacity for inhibiting
- the oxidation of fatty acids and/or triacylglycerols; and/or
- the rancidification of products that comprise one or a plurality of fatty acids and/or one or a plurality of triacylglycerols; and/or
- chemical and/or sensory changes of products that comprise one or a plurality of fatty acids and/or one or a plurality of triacylglycerols, caused by the action of the oxygen of the air also have flavoring properties. The compounds of formulae (I), (II) and (III) are therefore aroma-active compounds. Owing to the good activity of these compounds, described above, for inhibiting autoxidation, preferred concentrations of use are in the concentration range that is usually employed for flavoring materials. As, surprisingly, these compounds have flavoring properties, the use according to the invention of the compounds of formulae (I), (II) and (III) also contributes in a positive way to flavor and taste. The foregoing also applies to mixtures according to the invention and orally consumable preparations according to the invention.

The use according to the invention (as described above, preferably as characterized above as preferable) is preferred for inhibiting the oxidation of fatty acids and/or TAG catalyzed by divalent or higher-valent metal ions or the rancidification of products that comprise one or a plurality of fatty acids and/or one or a plurality of TAG, catalyzed by metal ions.

Divalent metal ions in particular promote the development of a rancid aroma or taste. However, higher-valent, in particular trivalent metal ions also catalyze the undesirable autoxidation process. A list of divalent and trivalent metal ions that promote the development of a rancid aroma or taste is given below.

The use according to the invention (as described above, preferably as characterized above as preferable) is preferred for inhibiting the oxidation of fatty acids and/or triacylglycerols or the rancidification of products that comprise one or a plurality of fatty acids and/or one or a plurality of triacylglycerols and/or chemical and/or sensory changes of products that comprise one or a plurality of fatty acids and/or one or a plurality of triacylglycerols, caused by the action of the oxygen of the air, wherein the fatty acids are selected from the group consisting of saturated fatty acids and singly, doubly, triply and more than triply unsaturated fatty acids; and/or
the triacylglycerols contain saturated fatty acid residues, singly unsaturated fatty acid residues, doubly unsaturated fatty acid residues, triply unsaturated and/or more than triply unsaturated fatty acid residues.

The use according to the invention (as described above, preferably as characterized above as preferable) for inhibiting the oxidation of fatty acids and/or TAG catalyzed by divalent or higher-valent metal ions or the rancidification of products catalyzed by metal ions, is supported in preferred configurations of the invention by adding further, antioxidant and/or preserving compounds. In this connection, see the details given below.

According to another aspect, the present invention relates to a mixture comprising:
(a) one, two or a plurality of compounds and/or one, two or a plurality of salts of the compounds of formulae (I), (II) and (III);
(b) one, two, three or a plurality of fatty acids and/or triacylglycerols; and
(c) none or one, two, three or a plurality of different metal ions, selected from the group consisting of metal cations of the first and second main group with an atomic number above 20, transition metal cations and metallic and semi-metallic cations of the third, fourth, fifth and sixth main group, wherein the cations are preferably selected from the group consisting of iron (Fe), copper (Cu), manganese (Mn), zinc (Zn), nickel (Ni), cadmium (Cd), lead (Pb), cobalt (Co), arsenic (As) and aluminum (Al) ions, wherein particularly preferably the cations are selected from the group consisting of iron (Fe), copper (Cu) and zinc (Zn) ions.

A mixture of this kind according to the invention is regularly obtained in the use according to the invention. Component (a) is usually, for the stated purposes, contacted, for example mixed, with a substance that comprises components (b) and (c).

All statements regarding preferred configurations of the use according to the invention also apply correspondingly to the mixtures according to the invention, and vice versa.

In a mixture according to the invention (as described above, preferably comprising the preferred and particularly preferred constituents described above) the compounds of component (a) are preferably present in a total concentration that is suitable:
- for inhibiting the oxidation of the constituents of component (b), i.e. the oxidation of the one, two, three or plurality of fatty acids and/or triacylglycerols of fatty acids; and/or
- for inhibiting the rancidification of the mixture; and/or
- for inhibiting chemical and/or sensory changes of the mixture caused by the action of the oxygen of the air.

Compared with a comparative mixture, which with otherwise identical composition does not comprise any compounds of component (a), in the mixture according to the invention a rancid taste or a rancid flavor develops much later, or later oxidative degradation of the constituents of component (b) contained in the mixture is observed.

The inhibition is particularly effective when, in the mixture according to the invention (as described above, preferably comprising the preferred and particularly preferred constituents described above), preferably the total amount of compounds of component (a) is in the range from 0.01 through 2.9 mmol per kg of mixture, preferably in the range from 0.05 through 0.20 mmol per kg of mixture; and/or the total amount of fatty acids and triacylglycerols (component (b)) is in the range from 99.96400 through 99.99972 wt. %, preferably in the range from 99.987600 through 99.99820 wt. %, particularly preferably in the range from 99.99000 through 99.99640 wt. %; and/or the total amount of iron (Fe), copper (Cu), manganese (Mn), zinc (Zn), nickel (Ni), cadmium (Cd), lead (Pb), cobalt (Co), arsenic (As) and aluminum (Al) ions is in the range from 0.00020 through 0.02000 wt. %, preferably in the range from 0.00100 through 0.01000 wt. %, and particularly preferably in the range from 0.00200 through 0.00800 wt. %; and/or the total amount of compounds of component (a), of fatty acids and triacylglycerols (component (b)) and of metal ions (component (c)) is at least 99.96408 wt. %, preferably at least 99.98840 wt. %, particularly preferably at least 99.99160 wt. %; and/or the ratio of the total weight of compounds of component (a) to fatty acids and triacylglycerols (component (b)) is in the range from $1:1.25*10^6$ through 1:6250; and/or the ratio of the total weight of compounds of component (a) to the total weight of iron (Fe), copper (Cu), manganese (Mn), zinc (Zn), nickel (Ni), cadmium (Cd), lead (Pb), cobalt (Co), arsenic (As) and aluminum (Al) ions is in the range from 1:250 through 1:0.0125;

wherein the percentages by weight are in each case relative to the total weight of the mixture.

A rancid taste or a rancid flavor is often not perceived until the degradation products formed during autoxidation in each case exceed a defined concentration (taste threshold value). Usual degradation products are for example propanal; pentanal; hexanal; 2E-hexenal; 2E-heptenal; 2E,4Z-heptadienal; 2E,4E-heptadienal; 2E-decenal, 2E,4E-nonadienal; 2E-undecenal; 2E,4Z-decadienal; 2E,4E-decadienal and 2E,4E,7Z-decatrienal.

A preferred mixture according to the invention (as described above, preferably comprising the preferred and particularly preferred constituents described above) is a mixture that contains:

a maximum of 3200 µg/kg hexanal, i.e. (3200 µg hexanal)/(kg mixture), preferably a maximum of 1600 µg/kg hexanal and particularly preferably a maximum of 320 µg/kg hexanal; and/or (preferably and)

a maximum of 40 µg/kg (E,Z)-2,4-decadienal, i.e. (40 µg (E,Z)-2,4-decadienal)/(kg mixture), preferably a maximum of 20 µg/kg (E,Z)-2,4-decadienal and particularly preferably a maximum of 4 µg/kg (E,Z)-2,4-decadienal; and/or (preferably and)

a maximum of 1800 µg/kg (E,E)-2,4-decadienal, i.e. (1800 µg (E,E)-2,4-decadienal)/(kg mixture), preferably a maximum of 900 µg/kg (E,E)-2,4-decadienal and particularly preferably a maximum of 180 µg/kg (E,E)-2,4-decadienal; and/or (preferably and)

a maximum of 140000 µg/kg (E)-2-heptenal, i.e. (140000 µg (E)-2-heptenal)/(kg mixture), preferably a maximum of 70000 µg/kg (E)-2-heptenal and particularly preferably a maximum of 14000 µg/kg (E)-2-heptenal.

A preferred mixture according to the invention (as described above, preferably as described above as preferable) is therefore present for example when none of the maximum concentrations of hexanal (3200 µg/kg), (E,Z)-2,4-decadienal (40 µg/kg), (E,E)-2,4-decadienal (1800 µg/kg) and (E)-2-heptenal (140000 µg/kg) in the mixture is exceeded.

A mixture according to the invention (as described above, preferably as described above as preferable) is in particular preferred when the taste threshold values of the aforementioned degradation products are not exceeded until after a long storage time, preferably not until after expiry of the best-before date. Storage is to be understood as the optimum storage conditions identified for the product.

The oxidative stability of animal and vegetable fats and oils or fatty acids can be determined experimentally (DIN EN ISO 6886:2008). For this, the fatty acids or the TAG are exposed to particularly oxidation-promoting conditions (100° C. through 120° C.). According to the standard, a purified air stream is led through the temperature-conditioned sample, and transfers the gases released during oxidation into a flask of deionized or distilled water. The concentration of degradation products is determined in this method (the so-called Rancimat method) as a function of time by conductivity measurement. The oxidative stability is stated as the induction period. This is the period between the start of measurement and the time point when the formation of degradation products begins to increase rapidly. The end of the induction period is therefore indicated when the conductivity begins to increase rapidly. This increase is caused by the accumulation of volatile fatty acids, which are produced during the oxidation process and are transferred to the flask. When using this method, a person skilled in the art chooses a temperature that is suitable for the particular TAG or fatty acid(s). According to the standard, the optimum induction period is between 6.0 h and 24.0 h. A temperature rise or a temperature drop of 10° C. decreases or increases the induction period by about a factor of 2.

A mixture according to the invention (as described above, preferably as characterized above as preferable) preferably has a composition such that:

it has an induction period longer than 6.0 hours, preferably longer than 12.0 hours, particularly preferably longer than 24.0 hours, according to DIN EN ISO 6886:2008, at a temperature of 110° C. or higher, preferably 120° C. or higher; and/or it has an induction period which, according to DIN EN ISO 6886:2008, at a temperature of 110° C. is at least 1.0 hours, preferably at least 2.0 hours longer than the induction period of a comparative mixture, which with otherwise identical composition does not comprise any compounds and salts of formulae (I), (II) and (III) as defined above.

The use according to the invention is preferably configured so that for the purpose of the inhibition, a mixture (according to the invention) is produced that has individual or a plurality of the properties stated above and/or hereunder.

It has already been described above that in particular unsaturated fatty acids and/or TAG, which contain unsaturated fatty acids in particular, are susceptible to oxidation processes. Therefore mixtures according to the invention (as described above, preferably as characterized above as preferable) preferably comprise one, two, three or a plurality of fatty acids selected from the group consisting of saturated fatty acids, singly unsaturated fatty acids, doubly unsaturated fatty acids, triply unsaturated fatty acids and more than triply unsaturated fatty acids and/or one, two, three or a plurality of triacylglycerols in each case containing one or a plurality of saturated fatty acid residues, singly unsaturated fatty acid residues, doubly unsaturated fatty acid residues, triply unsaturated fatty acid residues and/or more than triply unsaturated fatty acid residues.

Fatty acids or fatty acids that are contained in TAG are, in mixtures according to the invention, for example selected from the group consisting of omega-9 fatty acids, omega-6 fatty acids, omega-3 fatty acids and saturated fatty acids; fatty acids or fatty acids that are contained in TAG are, in mixtures according to the invention, preferably selected from the group consisting of oleic acid, linoleic acid, linolenic acid and palmitic acid. The use according to the invention is of course equally preferably directed at the stated fatty acids; as mentioned, the statements regarding preferred mixtures generally apply correspondingly to the uses according to the invention, and vice versa.

A preferred mixture according to the invention (as described above, preferably as described above as preferable), thus comprises as component (b) one, two, three or a plurality of fatty acids selected from the group consisting of oleic acid, linoleic acid, linolenic acid and palmitic acid and/or one, two, three or a plurality of triacylglycerols in each case containing one or a plurality of fatty acid residues selected from the group consisting of oleate, linoleate, linolenoate and palmitate.

A mixture according to the invention (as described above, preferably as described above as preferable) is preferably a homogeneous mixture.

In preferred mixtures according to the invention, the action of the compounds of component (a) is supported by the presence of further antioxidant and/or preserving compounds. Cf. the corresponding statements made above regarding the use according to the invention.

A particularly preferred mixture according to the invention (as described above, preferably as described above as preferable) is a mixture additionally containing one, two, three or a plurality of compounds selected from the group consisting of:

(d) compounds of formula (IV)

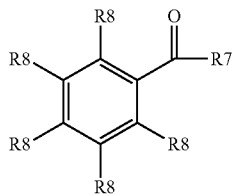

(IV)

wherein the residue R7 denotes OH, OCH$_3$ (methoxy), OC$_2$H$_5$ (ethoxy), or OCH$_2$CH$_2$CH$_3$ $_m$ (n-propoxy); and wherein each residue R8, independently of the meaning of another residue R8, denotes H, OH, OCH$_3$ (methoxy), OC$_2$H$_5$ (ethoxy) or OCH$_2$CH$_2$CH$_3$ (n-propoxy); and wherein preferably three or four of the residues R8, independently of the meaning of another residue R8, denote H, OH, OCH$_3$ (methoxy) or OC$_2$H$_5$ (ethoxy) and the further residue or residues R8, independently of the meaning of another residue R8, denote H, OH, OCH$_3$ (methoxy), OC$_2$H$_5$ (ethoxy) or OCH$_2$CH$_2$CH$_3$ (n-propoxy); and wherein particularly preferably three or four of the residues R8 denote H and the other residues R8, independently of the meaning of another residue R8, denote H, OH, OCH$_3$ (methoxy), OC$_2$H$_5$ (ethoxy) or OCH$_2$CH$_2$CH$_3$ (n-propoxy); and pharmaceutically acceptable salts thereof, (e) tartaric acid and pharmaceutically acceptable salts thereof;

(f) substances with antioxidant action selected from the group consisting of tocopherol (E306), ascorbic acid (E 300, 307-309), 6-palmitoyl-L-ascorbic acid (E304), gallates (propyl, octyl, dodecyl E310-312), butylhydroxytoluene (BHT, E321), butylhydroxyanisole (BHA, E320), tert.-butylhydroquinone (TBHQ), citric acid (E330) and citrates, lactic acid (E270) and lactates, orthophosphoric acid (E338), phosphates (E450 a-c), carnosol, rosemary extract, carnosol acid, rosmarinic acid, flavonoids including flavanols, flavanones, flavones, proanthocyanidins; hydroxycinnamic acids including caffeic acid, ferulic acid, coumaric acid; theaflavins, green tea extract, black tea extract, grapeseed extract, wine extracts, pomegranate extract, bilberry extract, cranberry extract, maté tea extract, Nero fruit extract, olive extract, cocoa extract, cinnamon extract, soya extract, coffee extract, malt extract, peppermint extract, tomato extract, and apple extract; and (g) preservatives selected from the group consisting of benzoic acid, the esters and salts thereof, propionic acid and salts thereof, salicylic acid and salts thereof and 2,4-hexadienoic acid (sorbic acid) and salts thereof.

Another particularly preferred mixture according to the invention (as described above, preferably described above as preferred and particularly preferred) is a mixture according to the invention additionally containing one, two, three or a plurality of compounds selected from the group consisting of (d) compounds of formula (IV)

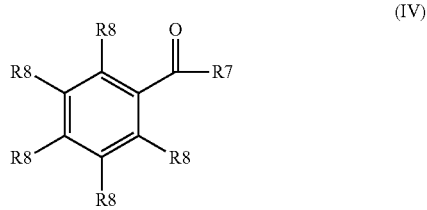

(IV)

wherein the residue R7 denotes OH; and wherein three or four of the residues R8 denote H and each of the other (one or two) residues R8 in each case independently of the meaning of the other residues R8 denotes H, OH or OCH$_3$ (methoxy); and wherein the compound of formula (IV) particularly preferably is selected from the group consisting of compound (IVa) (vanillic acid), compound (IVb) (para-hydroxybenzoic acid) and compound (IVc) (benzoic acid)

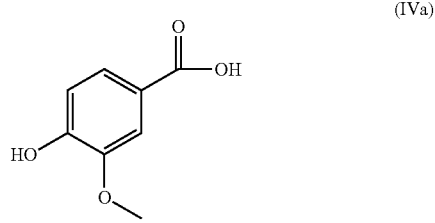

(IVa)

(IVb)

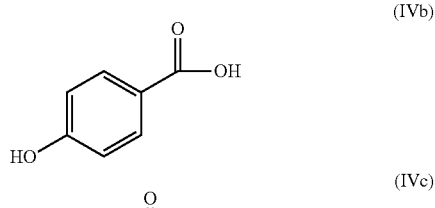

(IVc)

and pharmaceutically acceptable salts thereof.

The mixtures according to the invention defined above (as described above, preferably described above as preferred and particularly preferred) preferably are a constituent of orally consumable preparations.

The present invention also relates to orally consumable preparations, namely preparations comprising a mixture (as described above, preferably described above as preferred and particularly preferred) and a substrate or a carrier;

wherein relative to the total orally consumable preparation, the ratio of the total weight of compounds and salts of the component (a) to fatty acids and triacylglycerols (component (b)) is in the range from $1:1.25*10^6$ through 1:6250; and/or relative to the total orally consumable preparation the ratio of the total weight of compounds and salts of the component (a) to the total weight of iron (Fe), copper (Cu), manganese (Mn), zinc (Zn), nickel (Ni), cadmium (Cd), lead (Pb), cobalt (Co), arsenic (As) and aluminum (Al) ions is in the range from 1:250 through 1:0.0125.

Preferred substrates and carriers are for example maltodextrin (with DE values in the range 5 through 20 are particularly preferred), cyclodextrins, starch, egg yolk, carbohydrates, natural or artificial polysaccharides and/or vegetable gums such as modified starches (chemically or physically modified starches, degraded starches (starch hydrolyzates)) or gum arabic, ghatti gum, tragacanth, karaya, carrageenan, guar seed meal, locust bean meal, alginates, pectin, inulin or xanthan gum, colorants, e.g. permitted food dyes, coloring plant extracts, stabilizers, silicon dioxide (silicic acid, silica gel) and viscosity-modifying substances. It is unimportant which plant originally supplied the starch for making the starch hydrolysates. In particular, maize-based starches and starches from tapioca, rice, wheat or potatoes are suitable and are readily available. Moreover, other carriers described above (e.g. silicon dioxide) can advantageously function as anticaking agents.

Orally consumable preparations according to the invention (as described above) preferably comprise a proportion of fatty acids and triacylglycerols in the range from 5 through 95 wt. %, preferably 20 through 80 wt. %, particularly preferably 30 through 70 wt. %.

Orally consumable preparations according to the invention usually comprise a proportion of water.

Orally consumable preparations according to the invention (as described above) are in particular preparations serving for nutrition or for pleasure.

The orally consumable preparations according to the invention are regularly products that are intended to be introduced into the human oral cavity, to remain there for a certain time and then either be consumed (e.g. foodstuffs ready for consumption, see below) or to be removed again from the oral cavity. These products include all products or substances that are intended to be ingested by humans, in the processed, partially processed or unprocessed state. In particular, orally consumable preparations are products that are added to foodstuffs in their production, processing or treatment and are intended to be introduced into the human oral cavity, in particular with said foodstuff. Accordingly, such preparations can in their turn be contained in (further) preparations ready for use or consumption that serve for nutrition or pleasure (preparations ready for use or consumption that serve for nutrition or for pleasure are, in the context of the present text, in particular foodstuffs, especially foodstuffs ready for consumption (see below)). Moreover, such preparations can be a constituent of a semi-finished product, which optionally can be used in its turn for the production of preparations ready for use or consumption that serve for nutrition or pleasure.

Orally consumable preparations according to the invention are preferably preparations selected from the group consisting of dressings, sauces, stock cubes and jellies, soups (including dried soups and canned soups), mayonnaise (with e.g. egg yolk as carrier), margarines, butter-containing products, cream-containing products (including spray cream, baking mixes, dough products), crackers, biscuits, potato chips, extruded products (including extruded maize products with peanut and/or cheese flavor), peanuts and peanut-containing products (including snacks, salted peanuts, coated peanuts), baked products, pastries, ice cream, desserts, yoghurt, pudding, cocoa, cappuccino, milk coffee and drinking chocolates (including instant drinking chocolate and ready-to-drink drinking chocolate).

Particularly preferred orally consumable preparations according to the invention are mayonnaises and mayonnaise-containing products. Mayonnaises and mayonnaise-containing products that comprise mixtures according to the invention (as described above, in particular characterized above as preferred and particularly preferred), show particularly good inhibition of oxidation, or delay or inhibit a rancid taste and/or flavor particularly well.

In an orally consumable preparation according to the invention (as described above, preferably comprising the preferred and particularly preferred constituents described above) the compounds of component (a) are preferably present in a total concentration that is suitable:

for inhibiting the oxidation of the constituents of component (b) of the mixture present in the orally consumable preparation according to the invention, i.e. the oxidation of the one, two, three or a plurality of fatty acids and/or triacylglycerols of fatty acids; and/or for inhibiting the rancidification of the mixture present in the orally consumable preparation according to the invention; and/or for inhibiting chemical and/or sensory changes, caused by the action of the oxygen of the air, of the mixture present in the orally consumable preparation according to the invention.

Compared with a comparative orally consumable preparation, which with otherwise identical composition does not comprise any compounds of component (a), in preferred orally consumable preparations according to the invention a rancid taste or a rancid flavor therefore develops much later, or later oxidative degradation of the constituents of component (b) contained in the preparation is observed.

The preparations according to the invention that serve for nutrition or pleasure can, along with the animal or vegetable raw materials usually employed, additionally contain water, squalane or squalene, carbohydrates, for example glucose, sucrose or lactose, sweeteners, for example aspartame, cyclamate, saccharin, xylitol or sorbitol, bitter substances, for example caffeine or quinine, anti-bittering substances, for example lactisole, taste intensifying substances, for example sodium glutamate or inositol phosphate, amino acids, for example glycine, alanine, leucine, isoleucine, valine, proline, lysine, asparagine, aspartic acid, glutamine, glutamic acid, tryptophan, phenylalanine, tyrosine, threonine, serine, cystine, cysteine, methionine, hydroxyproline, arginine or histidine, peptides, proteins, enzymes, (other, not already mentioned above) fruit acids, preferably malic acid, in addition emulsifiers, which advantageously can be selected from the group of ionic, non-ionic, polymeric, phosphate-containing and zwitterionic emulsifiers, and in particular one or a plurality of thickening agents, which can advantageously be selected from the group of polysaccharides or derivatives thereof, e.g. hyaluronic acid or allulose derivatives, natural, nature-identical or synthetic flavoring materials and salts, for example sodium chloride or potassium chloride.

In another embodiment, the present invention also relates to a method of treating fatty acids and/or triacylglycerols or products that comprise one or a plurality of fatty acids and/or one or a plurality of triacylglycerols, with the following step:

(A) contacting or mixing;
  (a) one, two or a plurality of compounds and/or one, two or a plurality of salts (component (a)), with;
  (b) one, two or a plurality of fatty acids and/or one, two, three or a plurality of triacylglycerols or a product that comprises one or a plurality of fatty acids and/or one or a plurality of triacylglycerols (component (b)); and
optionally, simultaneously or in a subsequent step, with;
  (c) one, two, three or a plurality of different metal ions selected from the group consisting of metal cations of the first and second main group with an atomic number above 20, transition metal cations and metallic and semimetallic cations of the third, fourth, fifth and sixth main group, wherein the cations are preferably selected from the group consisting of iron (Fe), copper (Cu), manganese (Mn), zinc (Zn), nickel (Ni), cadmium (Cd), lead (Pb), cobalt (Co), arsenic (As) and aluminum (Al) ions, and wherein the cations are selected particularly preferably from the group consisting of iron (Fe), copper (Cu) and zinc (Zn) ions (component (c)); and/or with;
one, two, three or a plurality of compounds selected from the group consisting of:
  (d) compounds of formula (IV) as defined above, preferably as defined above as preferred and particularly preferably as defined above as particularly preferred;
  (e) tartaric acid and pharmaceutically acceptable salts thereof;
  (f) tocopherol (E306), ascorbic acid (E 300, 307-309), 6-palmitoyl-L-ascorbic acid (E304), gallates (propyl, octyl, dodecyl E310-312), butylhydroxytoluene (BHT, E321), butylhydroxyanisole (BHA, E320), tert.-butylhydroquinone (TBHQ), citric acid (E330) and citrates, lactic acid (E270) and lactates, orthophosphoric acid (E338), phosphates (E450 a-c), carnosol, rosemary extract, carnosol acid, rosmarinic acid, flavonoids including flavanols, flavanones, flavones, proanthocyanidins; hydroxycinnamic acids including caffeic acid, ferulic acid, coumaric acid; theaflavins, green tea extract, black tea extract, grapeseed extract, wine extracts, pomegranate extract, bilberry extract, cranberry extract, maté tea extract, Nero fruit extract, olive extract, cocoa extract, cinnamon extract, soya extract, coffee extract, malt extract, peppermint extract, tomato extract, and apple extract; and
  (g) benzoic acid esters, propionic acid and salts thereof, salicylic acid and salts thereof and 2,4-hexadienoic acid (sorbic acid) and salts thereof;
so that the oxidation of the fatty acids and/or of the triacylglycerols or the rancidification of the product that comprises one or a plurality of fatty acids and/or one or a plurality of triacylglycerols and/or the chemical and/or sensory change of the product that comprises one or a plurality of fatty acids and/or one or a plurality of triacylglycerols, caused by the action of the oxygen of the air, is inhibited.

A special embodiment of the method according to the invention (as described above), is a method preferably with the following additional step:
  (B) storing the product present after step (A) for a period of 1 day or more.

The following examples serve to clarify the invention, without limiting it thereby.

The following designations are used hereinafter:
Component (a): one, two or a plurality of compounds of formulae (I), (II) and (III) and/or pharmaceutically acceptable salts thereof;
Component (b): one, two, three or a plurality of fatty acids and/or triacylglycerols (TAG); and
Component (c): none or one, two, three or a plurality of different metal ions that support oxidation.

APPLICATION EXAMPLES 1.1 Production

For production of exemplary preparations or mixtures A1, A2, A3 and A4 and for production of comparative preparations or mixtures V1 and V2, in each case a basis mayonnaise was prepared, which had the following composition (data in wt. %):

Basis mayonnaise (composition):

| | |
|---|---|
| Soya oil, refined | 80.00 |
| Polyglycerol polyricinoleate | 0.20 |
| Salt | 1.30 |
| Sugar | 1.00 |
| Egg yolk | 6.00 |
| Acetic acid in water | 3.00 |
| Lemon juice | 0.90 |
| Water | 7.58 |

For production of the exemplary preparations or mixtures A1, A2, A3 and A4 the basis mayonnaise was in each case mixed with 30 ppm of a compound of the component (a), wherein the compound of the component (a) was selected as follows:
for A1: theanine (compound of formula (I));
for A2: cyclobutane-1,3-dicarboxylic acid-2,4-bis(2-hydroxyphenyl) (compound of formula (III));
for A3: isophorone (compound of formula (II)); and
for A4: ketoisophorone (compound of formula (II)).

The mayonnaise resulting in each case then received an admixture of iron ions (compound of component (c)) at a concentration of 25 ppm by adding Mohr's salt. The result was the exemplary preparations or mixtures A1, A2, A3 and A4.

For production of the comparative preparation or mixture V1, the basis mayonnaise was mixed with 75 ppm EDTA; EDTA is a known active substance for inhibiting rancidification. The resulting mayonnaise received an admixture of iron ions (compound of the component (c)) at a concentration of 25 ppm by adding Mohr's salt. The result was the comparative preparation or mixture V1.

For production of the comparative preparation or mixture V2, the basis mayonnaise was mixed with 30 ppm maltol; maltol is a known active substance for inhibiting rancidification. The resulting mayonnaise received an admixture of iron ions (compound of the component (c)) at a concentration of 25 ppm by adding Mohr's salt. The result was the comparative preparation or mixture V2.

1.2 Storage

Figure 2:
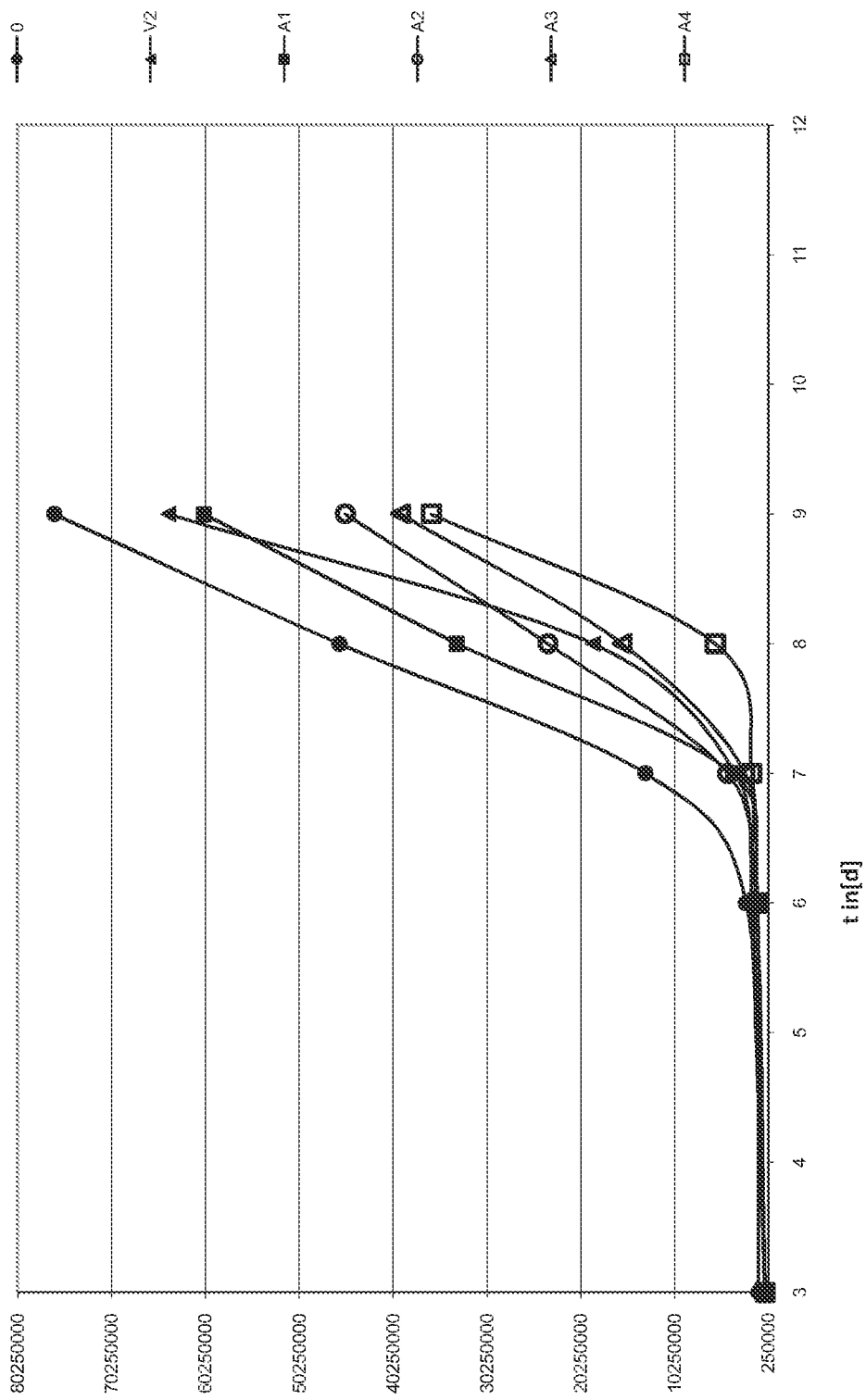
FIG. 2 is a graph of the amount of hexanal formed (integration of the peak areas after analysis; numerical values correspond to the magnitude of the peak area) in the period from 3 through 9 days in exemplary preparations or mixtures A1, A2, A3 and A4, and in the comparative preparation V2.

The resultant exemplary preparations or mixtures A1, A2, A3 and A4 and the comparative preparations or mixtures V1 and V2 were in each case stored for 14 days at 50° C. in a dark warming cabinet; informative measurement data were already obtained after 9 days, cf. FIG. 2.

1.3 Analysis

After storage according to 1.2, the resulting preparations or mixtures were investigated. Certain degradation products formed by oxidation and enriched in the stored preparations or mixtures were analyzed and quantified by GC-MS.

Two methods were used for this:
first method: Direct extraction of the aldehydes from the sample with Symstixx®; and
second method: Measurement of the selected aldehyde hexanal in the headspace above the sample.

Details of the two methods are presented below. The degradation products analyzed can be seen from FIG. 1 (first method after a storage time of 14 days) and FIG. 2 (second method up to storage time of 9 days).

First Method: Direct Extraction of the Aldehydes from the Sample with Symstixx®

Sample Preparation:
1.00 g of the respective sample was pipetted onto the bottom of a 20-ml headspace vial if possible without smearing on the glass wall
For each measuring point and each active substance, its own sample was prepared and sealed air-tight
Sampling:
In each measurement, a Symstixx (of the company Symrise, see EP 2 233 206 A1; Apparatus for determining volatile ingredients of a mixture) with a length of 6.0 cm was secured in the headspace of the respective sample with a septum and a clamping cap
Equilibration was carried out for 60 minutes at 40° C. in the warming cabinet
Then the Symstixx was transferred to a thermodesorption (TDS) sample tube (of the company Gerstel) and analyzed.
Analysis:
Gas chromatography with thermodesorption sample application (TDS of the company Gerstel);
Equipment parameters:
temperature program of the TDS: 20° C.-60° C./min—180° C.—6 min (splitless)
injector system: cold injection system (CIS4) operated with solvent vent, temperature program: −30° C.-12° C./s—240° C.—4 min
gas chromatograph (GC) Agilent 6890
temperature program of the gas chromatograph: 50° C.-4° C./min—210° C.-12° C./min—240° C.—27.5 min
separating column: DB-Wax 60 m 0.25 mm 0.25 μm
detector: mass selective detector (MSD) Agilent 5973N
integration of the relevant peaks (various aldehydes)

Second Method: Measurement of the Selected Aldehyde Hexanal in the Headspace Above the Sample Sample Preparation:
1.00 g of the sample was pipetted onto the bottom of a 20-ml headspace vial, if possible without smearing on the glass wall
For each measuring point and each active substance, its own sample was prepared and sealed air-tight with a crimp cap
Storage took place at 50° C. in the dark warming cabinet
Sampling:
The respective vial was transferred unopened to the agitator of an MPS2 (company Gerstel) and was equilibrated for 20 minutes at 50° C.
Then 2.0 ml headspace of the sample was analyzed directly (2.5 ml headspace syringe, 34° C.)

Analysis:
injector system: CIS4 operated in splitless mode; temperature program: 150° C.-12° C./s—200° C.—10 min
gas chromatograph (GC) Agilent 6890
temperature program: 40° C.-8° C./min—240° C.
separating column: ZB-Wax plus 60 m 0.32 mm 0.25 μm
detector: MSD Agilent 5973N
integration of the relevant peaks (hexanal)
comparison of the peak areas relative to time FIG. 1 shows the analysis results according to the first method for the exemplary preparations or mixtures A1 and A2 and for the comparative preparations or mixtures V1 and V2 after a storage time of 14 days.

FIG. 2 shows the analysis results according to the second method for the exemplary preparations or mixtures A1, A2, A3 and A4 and for the comparative preparation or mixture V2.

FIG. 1 shows the amount of aldehydes formed in μg/kg (relative to the total weight of the preparation). The figure shows that through the use according to the invention of compounds of the component (a) in the exemplary preparations or mixtures A1 and A2, similar stabilization of the component (b) was achieved, as by using EDTA in the comparative preparation V1 and as by using maltol in the comparative preparation V2.

FIG. 2 shows the amount of hexanal formed (integration of the peak areas after analysis; numerical values correspond to the magnitude of the peak area) in the period from 3 through 9 days in the exemplary preparations or mixtures A1, A2, A3 and A4, and in the comparative preparation V2. A lower value means here (in comparison with a comparative value) better inhibition of autoxidation. The curve designated "0" relates to a reference preparation, which apart from the basis mayonnaise contains only iron ions (component (c)) but no inhibitor (component (a)). Through the use according to the invention of compounds of the component (a) in the exemplary preparations or mixtures A1, A2, A3 and A4, the formation of hexanal is delayed (inhibited) in comparison with the reference preparation and in comparison with comparative preparation V2. Thus, the use according to the invention of compounds of the component (a) gives better stabilization of the component (b) than the use of maltol in the comparative preparation V2.

The above evaluations for the exemplary preparations or mixtures illustrate the efficient action of compounds of the component (a) when used according to the invention.

The recipes of the following general application example 1 through 6 comprise fractions of fatty acids or triacylglycerols (component (b)), to which an amount of the component (a) has already been added. The ratio of the total weights of the compound of the component (a) and of the compounds of the component (b) was adjusted in each case so that it is in the range from $1:1.25*10^6$ through 1:6250.

Each general application example was carried out with a total of four alternative, specific recipes, wherein alternatively compound (Ia) (theanine), compound (IIa) (3,5,5-trimethyl-2-cyclohexen-1-one (isophorone)), compound (IIb) (2,6,6-trimethyl-2-cyclohexene-1,4-dione (ketoisophorone)) and compound (III) (cyclobutane-1,3-dicarboxylic acid-2,4-bis(2-hydroxyphenyl)) were used as component (a). The following data for the general application examples therefore relate in each case to four alternative, specific configurations. As a further alternative, mixtures of compounds (Ia) (theanine), compound (IIa) (3,5,5-trimethyl-2-cyclohexen-1-one (isophorone)), compound (IIb) (2,6,6-trimethyl-2-cyclohexene-1,4-dione (ketoisophorone)) and compound (III) (cyclobutane-1,3-dicarboxylic acid-2,4-bis(2-hydroxyphenyl))

were used in general application examples; with respect to the total weights used, the foregoing applies correspondingly.

Application Example 1

Mayonnaise

| Name Of Raw Material | Content, Wt. % |
|---|---|
| Soya oil (as component (b)), refined (containing an addition of component (a); ratio of the total weights (a):(b) = 1:10000) | 80.02 |
| Polyglycerol polyricinoleate | 0.20 |
| Salt | 1.30 |
| Sugar | 1.00 |
| Egg yolk | 6.00 |
| Acetic acid in water | 3.00 |
| Lemon juice | 0.90 |
| Water | 7.58 |

First a mixture of polyglycerol polyricinoleate, salt and sugar in water is prepared. Then the oil is emulsified, adding the egg yolk to the mixture. In a final step, the acetic acid and the lemon juice are added and the resultant mixture homogenized using a hand-held stirrer. Preparation can also be carried out in a Thermomix (from the company Vorwerk).

Application Example 2

Edible Oils, e.g. Also for Frying

| | Content, Wt. % | | |
|---|---|---|---|
| Name Of Raw Material | A | B | C |
| Soya oil (as component (b)), refined (containing an addition of component (a); ratio of the total weights (a):(b) = 1:7000) | 99.99 | | |
| Safflower oil (as component (b)), cold-pressed (containing an addition of component (a); ratio of the total weights (a):(b) = 1:7000) | | 99.99 | |
| Olive oil (as component (b)), cold-pressed (containing an addition of component (a); ratio of the total weights (a):(b) = 1:7000) | | | 99.99 |
| alpha-Tocopherol | | 0.01 | 0.01 |

Application Example 3

Low-Fat Margarine

| Ingredient | Proportion, Wt. % | Amount Used, g |
|---|---|---|
| Hardened vegetable fat (as component (b), containing an addition of component (a); ratio of the total weights (a):(b) = 1:15000) | 40.05 | 600.75 |
| Drinking water | 55.38 | 830.7 |
| Salt | 0.20 | 3.0 |
| Monoglycerides Monomuls 90-35 (Grünau/Cognis) | 0.80 | 12.0 |
| Citric acid | 0.02 | 0.3 |
| Whey protein | 1.50 | 22.5 |
| Lecithin | 2.00 | 30.0 |
| beta-Carotene emulsion | | 8 drops |
| Flavoring | 0.05 | 0.75 |

The water and the fat were heated separately to approximately 55° C. Salt, citric acid, whey protein and beta-carotene emulsion were stirred into the heated water and distributed uniformly. Monoglycerides Monomuls and lecithin were added to the heated fat phase and uniformly distributed as well. Then the water phase was added slowly to the fat phase, first stirring slowly (300 rpm), then stirring vigorously (1500 rpm, 30 s, blade insert, Ultraturrax). The flavoring was stirred in last. The preparation was cooled to 35° C., filled and stored cool (5° C.).

Application Example 4

Ice Cream

| Ingredient | Proportion, Wt. % | Amount Used, g |
|---|---|---|
| Skimmed milk | 60.65 | 606.5 |
| Vegetable fat mixture (as component (b), containing an addition of component (a); ratio of the total weights (a):(b) = 1:20000), containing approximately 50% safflower oil and 50% palm oil, melting range 35 through 40° C. | 16.50 | 165.0 |
| Sugar | 12.00 | 120.0 |
| Skimmed milk powder | 5.00 | 50.0 |
| Glucose syrup 72% dry matter | 5.00 | 50.0 |
| Emulsifier SE 30 (Grindstedt Products, Denmark) | 0.65 | 6.5 |
| Flavoring, containing 0.1% diacetyl and 1% vanillin | 0.20 | 2.0 |

The skimmed milk and the glucose syrup were heated to 55° and sugar, skimmed milk powder and emulsifier were added. The vegetable fat was first preheated, then added and the whole was heated to 58° C. After adding the flavoring, the mixture was homogenized (180/50 bar). The resultant paste was kept hot for 1 min at 78° C., then cooled to 2 through 4° C. and was then submitted to a 10-hour maturation process. After that, the matured paste was filled and stored at −18° C.

Application Example 5

Low-Fat Mayonnaise

| Ingredient | Proportion, Wt. % | Amount Used, g |
|---|---|---|
| Sunflower oil (as component (b), containing an addition of component (a); ratio of the total weights (a):(b) = 1:20000) | 10.505% | 52.525 |
| Emulsifier (lecithin) | 0.50% | 2.5 |
| Tap water | 71.80% | 359.0 |
| Vinegar 10% | 7.50% | 37.5 |
| Modified waxy maize starch | 4.00% | 20.0 |
| Sucrose | 2.50% | 12.5 |
| Mustard flour | 1.00% | 5.0 |
| Table salt | 0.70% | 3.5 |
| Sodium saccharin | 0.02% | 0.1 |
| Amino acids | 0.025% | 0.125 |
| Stabilizer (xanthan) | 0.20% | 1.0 |
| Stabilizer (sodium casein) | 0.30% | 1.5 |
| Dye | | a few drops |
| Egg flavor | 0.15% | 0.75 |
| Lemon juice | 0.50% | 2.5 |
| Citric acid | 0.30% | 1.5 |

The lecithin and the sunflower oil were mixed together first. Starch, sucrose, mustard flour, salt, saccharin, amino acids, xanthan, casein and dye were also mixed together and stirred into the cold tap water with a surface stirrer. The aqueous mixture was boiled and then cooled to 50° C. The lecithin-oil mixture was then added to the aqueous mixture and homogenized with an Ultra-Turrax. During homogenization, first a mixture of vinegar/lemon juice/citric acid and finally the egg flavor were added slowly.

Application Example 6

Fish Oil-Containing Beverage Emulsion

| Ingredient | Proportion, Wt. % | Amount Used, g |
|---|---|---|
| Invert sugar syrup, 72.7% from sugar beet | 13.75 | 137.5 |
| Citric acid solution in water | 0.5 | 5.0 |
| Fish oil emulsion (as component (b), containing an addition of component (a); ratio of the total weights (a):(b) = 1:50000)) | 17.0 | 170.0 |
| Carbonized drinking water approximately 8 g/l $CO_2$ | 68.63 | 686.3 |
| Flavoring (lemon flavor) | 0.12 | 1.2 |

The citric acid solution, the fish oil emulsion and the flavoring were added to the invert sugar syrup and mixed together well, so that a uniform syrup was obtained. The syrup was filled in bottles and diluted with carbonized drinking water.

The fish oil emulsion used is an orally consumable preparation according to the invention; it comprises approximately 30 wt. % oil. Its use ensures that the beverage emulsion does not develop any rancid sensory impressions even after a long storage time.

What is claimed is:

1. A method for inhibiting the oxidation of fatty acids and/or triacylglycerols catalyzed by divalent or higher-valent metal ions or for inhibiting the rancidification of products that comprise one or more fatty acids and/or one or more triacylglycerols catalyzed by divalent or higher-valent metal ions comprising:
   (a) forming a mixture of the fatty acids and/or triacylglycerols with one or more compounds selected from the group consisting of:
   i) a compounds of formula (I)

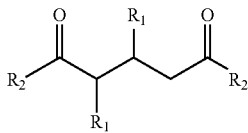

(I)

wherein each $R_1$ independently denotes H, OH, or $NH_2$; and
   each $R_2$ independently denotes OH, $OCH_3$, $OC_2H_5$, $OCH_2CH_2CH_3$, $NHCH_3$, $NHC_2H_5$, or $NHCH_2CH_2CH_3$; or a pharmaceutically acceptable salt thereof;

ii) a compound of formula (II)

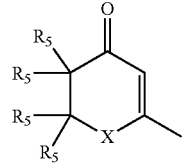

(II)

wherein each $R_5$ independently denotes H or $CH_3$; and
   x denotes $CH_2$ or CO; or a pharmaceutically acceptable salt thereof; and
   iii) a compound of formula (III)

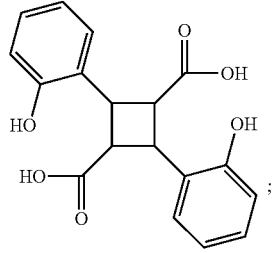

(III)

or a pharmaceutically acceptable salt thereof; and
   (b) inhibiting the oxidation of the fatty acids and/or triacylglycerols catalyzed by divalent or higher-valent metal ions.

2. The method of claim 1 for inhibiting the oxidation of fatty acids, wherein the fatty acids are selected from the group consisting of saturated fatty acids and singly, doubly, triply, and more than triply unsaturated fatty acids.

3. The method of claim 1 for inhibiting the oxidation of triacylglycerols, wherein the triacylglycerols contain saturated fatty acid residues, singly unsaturated fatty acid residues, doubly unsaturated fatty acid residues, triply unsaturated and/or more than triply unsaturated fatty acid residues.

4. The method of claim 1, wherein the total amount of compounds and salts of formula (I), formula (II), and formula (III) is in the range of 0.01 through 2.9 mmol per kg of the mixture.

5. The method of claim 1, wherein the total amount of compounds and salts of formula (I), formula (II), and formula (III) is in the range of 0.05 through 0.20 mmol per kg of the mixture.

6. The method of claim 1, wherein the total amount of fatty acids and triacylglycerols is in the range from 99.96400 through 99.99972 wt. %, wherein the percentage by weight is relative to the total weight of the mixture.

7. The method of claim 1, wherein the total amount of fatty acids and triacylglycerols is in the range from 99.987600 through 99.99820 wt. %, wherein the percentage by weight is relative to the total weight of the mixture.

8. The method of claim 1, wherein the total amount of fatty acids and triacylglycerols is in the range from 99.99000 through 99.99640 wt. %, wherein the percentage by weight is relative to the total weight of the mixture.

9. The method of claim 1, wherein the ratio of the compounds and salts of formula (I), formula (II), and formula (III) to the fatty acids and triacylglycerols is in the range from 1:1.25·$10^6$ through 1:6250.

10. The method of claim 1, wherein the mixture further comprises one or more different metal ions selected from the group consisting of metal cations of the first and second main group with an atomic number above 20, transition metal cations and metallic and semi-metallic cations of the third, fourth, fifth and sixth main group.

11. The method of claim 10, wherein the cations are selected from the group consisting of iron, copper, manganese, zinc, nickel, cadmium, lead, cobalt, arsenic and aluminum ions.

12. The method of claim 10, wherein the cations are selected from the group consisting of iron, copper and zinc ions.

13. The method of claim 10, wherein the total amount of iron, copper, manganese, zinc, nickel, cadmium, lead, cobalt, arsenic and aluminum ions is in the range from 0.00020 through 0.02000 wt. %, wherein the percentage by weight is relative to the total weight of the mixture.

14. The mixture of claim 10, wherein the total amount of iron, copper, manganese, zinc, nickel, cadmium, lead, cobalt, arsenic and aluminum ions is in the range from 0.00100 through 0.01000 wt. %, wherein the percentage by weight is relative to the total weight of the mixture.

15. The method of claim 10, wherein the total amount of iron, copper, manganese, zinc, nickel, cadmium, lead, cobalt, arsenic and aluminum ions is in the range from 0.00200 through 0.00800 wt. %, wherein the percentage by weight is relative to the total weight of the mixture.

16. The method of claim 10, wherein the total amount of compounds and salts of formula (I), formula (II), and formula (III), of fatty acids and triacylglycerol, and of metal ions, is at least 99.96408 wt. %, wherein the percentage by weight is relative to the total weight of the mixture.

17. The method of claim 10, wherein the total amount of compounds and salts of formula (I), formula (II), and formula (III), of fatty acids and triacylglycerols, and of metal ions, is at least 99.98840 wt. %, wherein the percentage by weight is relative to the total weight of the mixture.

18. The method of claim 10, wherein the total amount of compounds and salts of formula (I), formula (II), and formula (III), of fatty acids and triacylglycerols, and of metal ions, is at least 99.99160 wt. %, wherein the percentage by weight is relative to the total weight of the mixture.

19. The method of claim 10, wherein the ratio of the total weights (a) of compounds and salts of formula (I), formula (II), and formula(III), to the total weight of iron, copper, manganese, zinc, nickel, cadmium, lead, cobalt, arsenic and aluminum ions is in the range from 1:250 through 1:0.0125.

20. The method of claim 10, wherein the mixture comprises a maximum of 3200 µg/kg hexanal.

21. The method of claim 10, wherein the mixture comprises a maximum of 1600 µg/kg hexanal.

22. The method of claim 10, wherein the mixture comprises a maximum of 320 µg/kg hexanal.

23. The method of claim 10, wherein the mixture comprises a maximum of 40 µg/kg (E,Z)-2,4-decadienal.

24. The method of claim 10, wherein the mixture comprises a maximum of 20 µg/kg (E,Z)-2,4-decadienal.

25. The method of claim 10, wherein the mixture comprises a maximum of 4 µg/kg (E,Z)-2,4-decadienal.

26. The method of claim 10, wherein the mixture comprises a maximum of 1800 µg/kg (E,E)-2,4-decadienal.

27. The method of claim 10, wherein the mixture comprises a maximum of 900 µg/kg (E,E)-2,4-decadienal.

28. The method of claim 10, wherein the mixture comprises a maximum of 180 µg/kg (E,E)-2,4-decadienal.

29. The method of claim 10, wherein the composition of the mixture is such that it has an induction period longer than 6.0 hours according to DIN EN ISO 6886:2008, at a temperature of 110° C. or higher.

30. The method of claim 10, wherein the composition of the mixture is such that it has an induction period longer than 12.0 hours according to DIN EN ISO 6886:2008, at a temperature of 110° C. or higher.

31. The method of claim 10, wherein the composition of the mixture is such that it has an induction period longer than 24.0 hours according to DIN EN ISO 6886:2008, at a temperature of 110° C. or higher.

32. The method of claim 10, wherein the composition of the mixture is such that it has an induction period longer than 24.0 hours according to DIN EN ISO 6886:2008, at a temperature of 120° C. or higher.

33. The method of claim 10, wherein the composition of the mixture is such that it has an induction period which, according to DIN EN ISO 6886:2008, at a temperature of 110° C. is at least 1.0 hour longer than the induction period of a comparative mixture, which with an otherwise identical composition does not comprise any compounds and salts of formula (I), formula (II), and formula (III).

34. The method of claim 10, wherein the composition of the mixture is such that it has an induction period which, according to DIN EN ISO 6886:2008, at a temperature of 110° C. is at least 6.0 hours longer than the induction period of a comparative mixture, which with an otherwise identical composition does not comprise any compounds and salts of formula (I), formula (II), and formula (III).

35. The method of claim 1, wherein the mixture is a homogeneous mixture.

36. The mixture of claim 10, wherein the mixture is a homogeneous mixture.

37. The method of claim 1, wherein the mixture further comprises one or more compounds selected from the group consisting of:
(iv) a compound of formula (IV)

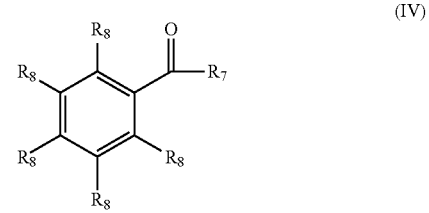

(IV)

wherein the residue R7 denotes OH, OCH$_3$, OC$_2$H$_5$, or OCH$_2$CH$_2$CH$_3$; and
wherein each residue R8, independently of the meaning of another residue R8, denotes H, OH, OCH$_3$, OC$_2$H$_5$ or OCH$_2$CH$_2$CH$_3$; or a pharmaceutically acceptable salt thereof;
(v) tartaric acid or a pharmaceutically acceptable salt thereof;
(vi) a substance with antioxidant action selected from the group consisting of tocopherol, ascorbic acid, 6-palmitoyl-L-ascorbic acid, gallates, butylhydroxytoluene (BHT), butylhydroxyanisole (BHA), tert. butylhydroquinone (TBHQ), citric acid and citrates, lactic acid and lactates, orthophosphoric acid, phosphates, carnosol, carnosol acid, rosmarinic acid, flavonoids including flavanols, flavanones, flavones, proanthocyanidins;

hydroxycinnamic acids including caffeic acid, ferulic acid, coumaric acid; and theaflavins; and (vii) a preservative selected from the group consisting of benzoic acid esters, propionic acid and salts thereof, salicylic acid and salts thereof and 2,4-hexadienoic acid (sorbic acid) and salts thereof.

38. The method of claim 28, wherein three or four of the residues R8, independently of the meaning of another residue R8, denote H, OH, OCH$_3$ or OC$_2$H$_5$ and the further residue or residues R8, independently of the meaning of another residue R8, denote H, OH, OCH$_3$, OC$_2$H$_5$ or OCH$_2$CH$_2$CH$_3$.

39. The method of claim 28, wherein three or four of the residues R8 denote H and the other residues R8, independently of the meaning of another residue R8, denote H, OH, OCH$_3$, OC$_2$H$_5$ or OCH$_2$CH$_2$CH$_3$.

40. The method of claim 10 further comprising one or more compounds selected from the group consisting of:

(iv) a compound of formula (IV)

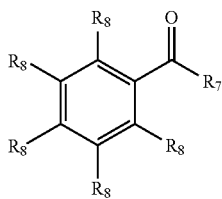

(IV)

wherein the residue R7 denotes OH, OCH$_3$, OC$_2$H$_5$, or OCH$_2$CH$_2$CH$_3$; and wherein each residue R8, independently of the meaning of another residue R8, denotes H, OH, OCH$_3$, OC$_2$H$_5$ or OCH$_2$CH$_2$CH$_3$; or a pharmaceutically acceptable salt thereof;

(v) tartaric acid or a pharmaceutically acceptable salt thereof;

(vi) a substance with antioxidant action selected from the group consisting of tocopherol, ascorbic acid, 6-palmitoyl-L-ascorbic acid, gallates, butylhydroxytoluene (BHT), butylhydroxyanisole (BHA), tert.butylhydroquinone (TBHQ), citric acid and citrates, lactic acid and lactates, orthophosphoric acid, phosphates, carnosol, carnosol acid, rosmarinic acid, flavonoids including flavanols, flavanones, flavones, proanthocyanidins; hydroxycinnamic acids including caffeic acid, ferulic acid, coumaric acid; and theaflavins; and (vii) a preservative selected from the group consisting of benzoic acid esters, propionic acid and salts thereof, salicylic acid and salts thereof and 2,4-hexadienoic acid (sorbic acid) and salts thereof.

41. The method of claim 40, wherein three or four of the residues R8, independently of the meaning of another residue R8, denote H, OH, OCH$_3$ or OC$_2$H$_5$ and the further residue or residues R8, independently of the meaning of another residue R8, denote H, OH, OCH$_3$, OC$_2$H$_5$ or OCH$_2$CH$_2$CH$_3$.

42. The method of claim 40, wherein three or four of the residues R8 denote H and the other residues R8, independently of the meaning of another residue R8, denote H, OH, OCH$_3$, OC$_2$H$_5$ or OCH$_2$CH$_2$CH$_3$.

* * * * *